United States Patent [19]

Yano et al.

[11] Patent Number: 4,782,108

[45] Date of Patent: Nov. 1, 1988

[54] POLYPHENYLENE ETHER COMPOSITIONS

[75] Inventors: Kazunori Yano; Shigekazu Ohi; Yoshinobu Kobayashi; Katsuhiro Abe, all of Mie, Japan

[73] Assignee: Mitsubishi Petrochemical Co., Ltd., Tokyo, Japan

[21] Appl. No.: 80,896

[22] Filed: Aug. 3, 1987

[30] Foreign Application Priority Data

Apr. 14, 1987 [JP] Japan .................................. 62-91664

[51] Int. Cl.$^4$ ................................................ C08K 5/01
[52] U.S. Cl. ..................................... 524/490; 524/491; 525/133; 525/391; 525/392; 525/397
[58] Field of Search ................ 524/490, 491; 525/133, 525/391, 392, 397

[56] References Cited

U.S. PATENT DOCUMENTS

| | | |
|---|---|---|
| 2,455,890 | 12/1948 | Fawcett et al. .................... 524/490 |
| 3,660,531 | 5/1972 | Lauchlan et al. .................. 525/392 |
| 4,102,850 | 7/1978 | Cooper et al. . |
| 4,128,602 | 12/1978 | Katchman et al. ................ 525/133 |
| 4,128,604 | 12/1978 | Katchman et al. ................ 525/133 |
| 4,131,598 | 12/1978 | Abolins et al. .................... 525/133 |
| 4,145,377 | 3/1979 | Bussink et al. . |
| 4,158,028 | 6/1979 | Izawa et al. ...................... 525/133 |
| 4,282,355 | 8/1981 | Sugio et al. ....................... 525/68 |
| 4,283,503 | 8/1981 | Wright .............................. 525/133 |
| 4,311,633 | 1/1982 | Lee, Jr. ............................. 525/133 |
| 4,339,376 | 7/1982 | Kasahara .......................... 525/133 |
| 4,368,293 | 1/1983 | Yamashita et al. ................ 525/392 |
| 4,369,278 | 1/1983 | Kasahara et al. .................. 525/392 |
| 4,389,511 | 6/1983 | Cooper et al. .................... 525/392 |
| 4,446,272 | 5/1984 | Fukuda et al. .................... 525/392 |
| 4,454,284 | 6/1984 | Ueno et al. ....................... 525/133 |

FOREIGN PATENT DOCUMENTS

| | | |
|---|---|---|
| 0555930 | 4/1958 | Canada ............................. 524/491 |
| 0150021 | 7/1985 | European Pat. Off. ........... 525/391 |
| 0209874 | 1/1987 | European Pat. Off. . |
| 84852 | 5/1983 | Japan . |
| 1016963 | 1/1986 | Japan ............................... 525/391 |
| 1016333 | 5/1983 | U.S.S.R. ........................... 524/490 |

Primary Examiner—Joseph L. Schofer
Assistant Examiner—J. M. Reddick
Attorney, Agent, or Firm—Oblon, Fisher, Spivak, McClelland & Maier

[57] ABSTRACT

Polyphenylene ether compositions comprising a polyphenylene ether, an alkenylaromatic polymer, a rubber substance, a polyethylene or ethylenic copolymer, and a mineral oil. These polyphenylene compositions are excellent in the balance among fluidity, impact resistance and gloss.

16 Claims, No Drawings

POLYPHENYLENE ETHER COMPOSITIONS

FIELD OF THE INVENTION

The present invention relates to polyphenylene ether compositions which comprise a polyphenylene ether, a rubber-modified alkenylaromatic polymer, a rubber substance, an ethylenic polymer and a specific mineral oil, and which are improved in the balance among fluidity, gloss and impact resistance, and to provision of polyphenylene ether compositions which are excellent in moldability and impact resistance.

BACKGROUND OF THE INVENTION

Polyphenylene ether has the disadvantages of being poor in fluidity and impact resistance while excellent in heat resistance, and mechanical and electrical properties. It is known that in order to eliminate the above disadvantages of a polyphenylene ether, a rubber-modified alkenylaromatic polymer compatible with the polyphenylene ether is compounded. In polyphenylene ether compositions with such rubber-modified alkenylaromatic polymer compounded thereto, however, if the rubber content is increased to improve their impact resistance, the fluidity and gloss of the compositions will be considerably decreased.

Various attempts have been made to improve the balance among fluidity, gloss and impact resistance of compositions comprising a polyphenylene ether and a rubber-modified alkenylaromatic polymer. For example, Japanese Laid-Open patent application Nos. 84852/83 and 131051/80 disclose a method of improving the fluidity of compositions comprising a polyphenylene ether and a rubber-modified alkenylaromatic polymer by compounding thereto a mineral oil or a low molecular weight polyolefin. Japanese Laid-Open patent application No. 194947/83 discloses a method of improving the impact strength of compositions comprising a polyphenylene ether and a rubber-modified alkenylaromatic polymer-by compounding thereto a carbonyl or hydroxyl group-containing ethylenic copolymer. It has been revealed, however, that the above methods improve fluidity, gloss and impact strength to some extent, but fail to sufficiently improve the balance among them.

SUMMARY OF THE INVENTION

As a result of extensive investigations to overcome the prior art problems, it has been found that fluidity and impact strength can be increased at the same time by combining a polyphenylene ether, an alkenylaromatic polymer, a rubber substance, a polyethylene or ethylenic copolymer, and a specific mineral oil. The present invention relates to polyphenylene ether compositions comprising:

100 parts by weight of a resin composition comprising (A) a polyphenylene ether, (B) an alkenylaromatic polymer, the weight ratio of (A) to (B) being $(A)/(A)+(B) > 0.2$, and 1 to 15 parts by weight per 100 parts by weight of the total weight of (A) and (B) of (C) a rubber substance;

0.5 to 10 parts by weight of (D) a polyethylene or ethylenic copolymer; and 0.5 to 5 parts by weight of (E) a mineral oil.

DETAILED DESCRIPTION OF THE INVENTION

The polyphenylene ether (A) as used herein includes both homopolymers having a recurring unit represented by the general formula:

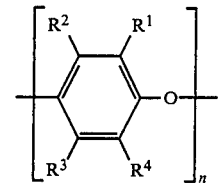

and copolymers having two or more of the recurring units represented by the above general formula within the range that does not decrease the basic characteristics such as heat resistance and mechanical strength of the polyphenylene ether in practical use.

In the above general formula, n is at least 50. $R^1$, $R^2$, $R^3$ and $R^4$, which may be the same or different, each represents a hydrogen atom, a halogen atom, a hydrocarbon group, a substituted hydrocarbon group, a hydrocarbon oxy group, or a substituted hydrocarbon oxy group. Typical examples of $R^1$, $R^2$, $R^3$ and $R^4$ include a hydrogen atom, a halogen atom such as chlorine, bromine and iodine, a hydrocarbon group such as methyl, ethyl, propyl, isopropyl, butyl, tert-butyl, allyl, phenyl, benzyl and methylbenzyl, a substituted hydrocarbon group such as chloromethyl and bromomethyl, a hydrocarbon oxy group such as methoxy, ethoxy and phenoxy, and a substituted hydrocarbon oxy group such as chloroethoxy. Representative examples of the polyphenylene ether include homopolymers such as poly-2,6-dimethyl-1,4-phenylene ether, poly-2,6-diethyl-1,4-phenylene ether, poly-2,6-dipropyl-1,4-phenylene ether, poly-2-methyl-6- C isopropyl-1,4-phenylene ether, poly-2-ethyl-6-isopropyl-1,4-phenylene ether, poly-2,6-dimethoxy-1,4-phenylene ether, poly-2,6-diphenyl-1,4-phenylene ether, poly-2,6- dichloro-1,4-phenylene ether and poly-2,5-dimethyl-1,4-phenylene ether, and copolymers such as a copolymer of 2,6-dimethylphenol and 2,3,6-trimethylphenol and a copolymer of 2,6-dimethylphenol and 3-methyl-6-tert-butylphenol.

The polyphenylene ether as used herein includes the modified products of the above homopolymers or copolymers as well. For example, polymers obtained by oxidative polymerizing phenol compounds represented by the formula:.

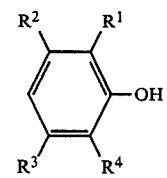

($R^1$, $R^2$, $R^3$ and $R^4$ have the same significance as above) in the presence of polystyrene, polymers obtained by polymerizing styrene in the presence of polyhhenylene ether homopolymers or copolymers, and polymers obtained by kneading polyphenylene ether homopolymers or copolymers, styrene and peroxides in an extruder to react with each other can be used.

The alkenylaromatic polymer (B) as used herein includes homopolymers or copolymers containing at least 50% by weight of alkenylaromatic compounds represented by the general formula:

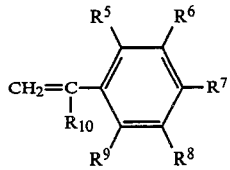

wherein $R^5$, $R^6$, $R^7$, $R^8$ and $R^9$, which may be the same or different, each represents a hydrogen atom, a halogen atom, a hydrocarbon group, a substituted hydrocarbon group, a hydrocarbon oxy group, or a substituted hydrocarbon oxy group, and $R^{10}$ is a hydrogen atom or a lower alkl group having 1 to 4 carbon atoms. Representative examples of $R^5$, $R^6$, $R^7$, $R^8$ and $R^9$ include a hydrogen atom, a halogen atom such as chlorine and bromine, a hydrocarbon group such as methyl, ethyl, propyl, vinyl, allyl, benzyl and methylbenzyl, a substituted hydrocarbon group such as chloromethyl and bromomethyl, and a hydrocarbon oxy group such as methoxy, ethoxy and phenoxy, and a substituted hydrocarbon oxy group such as monochloromethoxy. Representative examples of $R^{10}$ include a hydrogen atom and a lower alkyl group such as methyl and ethyl. Representative examples of the alkenylaromatic polymers include polystyrene, polychlorostyrene, poly-α-methylstyrene, a styreneacrylonitrile copolymer, a styrene-α-methylstyrene copolymer, a styrene-4-methylstyrene copolymer, a styrene-maleic anhydride copolymer, a styrene-methyl methacrylate copolymer, polybutadiene-modified high impact polystyrene and a styrene-acrylonitrile-butadiene terpolymer. Of these polymers, polystyrene is particularly preferred.

The rubber substance (C) as used herein includes substances exhibiting rubber elasticity at ordinary temperature, including polybutadiene, a butadiene-styrene copolymer and an ethylene-propylene-diene rubber.

The rubber substance (C) can be kneaded with the polyphenylene ether (A) and the alkenylaromatic polymer (B) by any known techniques. For example, a mechanically mixing method and a solution blending method can be employed. Particularly preferred is a method in which rubber-modified alkenylaromatic polymers obtained by dissolving rubber in alkenylaromatic monomers and then polymerizing the solution is kneaded with the polyphenylene ether to compound the alkenylaromatic polymer and the rubber substance to the polyphenylene ether at the same time.

If necessary, polybutadiene or a butadiene-styrene copolymer may be used in combination with the rubber-modified alkenylaromatic polymers.

The polyethylene or ethylenic copolymer (D) as used herein has a density of 0.88 to 0.96 g/cm³, preferably 0.90 to 0.94 g/cm³, and a melt flow rate (as measured at a temperature of 190° C. and under a load of 2.16 kg) of 1 to 80, preferably 2 to 50. If the melt flow rate is less than 1 or more than 80, the effect of improving impact strength is undesirably poor.

The polyethylene and ethylenic copolymer as used herein preferably has a melt flow ratio of up to 10 and more preferably has a melt flow ratio of up to 8. If the melt flow ratio is more than 10, the effect of improving impact resistance is poor; in some case, the impact resistance is decreased. The term "melt flow ratio" as used herein means a value obtained by dividing the melt flow rate as determined at a temperature of 190° C. under a load of 10 kg by the melt flow rate as determined at a temperature of 190° C. under a load of 2.16 kg.

The polyethylene or ethylenic copolymer (D) as used herein includes, for example,, a lohg chain branched polyethylene, a short chain branched polyethylene and copolymers of ethylene and other comonomers.

Comonomers copolymerizable with ethylene include α-olefins having 3 to 8 carbon atoms, and vinyl monomers represented by the formula:

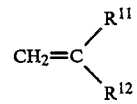

wherein $R^{11}$ is a hydrogen atom or a methyl group, $R^{12}$ is a group $-OCOR^{13}$ or a group $-COOR^{14}$, wherein $R^{13}$ and $R^{14}$, which may be the same or different, each represents an alkyl group having 1 to 6 carbon atoms. Representative examples are α-olefins such as propylene, butene-1, 4-methylpentene-1, hexene and octene, vinyl acetate, vinyl propionate, methyl acrylate, ethyl acrylate, butyl acrylate, 2-ethylhexyl acrylate, stearyl acrylate, methyl methacrylate, butyl methacrylate, octyl methacrylate and stearyl methacrylate.

The polyethylene or ethylenic copolymer as used herein can be prepared by known polymerization methods. For example, the ethylenic copolymers as used herein can be produced by ion polymerizing ethylene and α-olefins having 3 to 10 carbon atoms,, preferably 4 to 8 carbon atoms in the presence of a Ziegler Natta catalyst comprising titanium chloride, an organic aluminum compound and so on. The α-olefin content is usually 0.5 to 10% by weight and preferably 2 to 8% by weight.

The mineral oil (E) as used herein refers to an organic oily substance. A useful example is a paraffin mineral oil having an average molecular weight of 500 to 1,000. A mineral oil composed mainly of a paraffinic saturated hydrocarbon is preferred in comparison with an aromatic mineral oil. Representative examples of the paraffin mineral oil are Diana Process Oil PW-380, PW-90, etc. (manufactured by Idemitsu Kosan Co., Ltd.).

The mineral oil (E) as used herein preferably has a viscosity-density constant of up to 0.819. This viscosity-density constant is determined by the method of Sun Oil Co., and is calculated from the following equation:

$$\frac{G - 0.24 - 0.022 \log(V_1 - 35.5)}{0.755}$$

wherein
G: Density at 60° F.
$V_1$: Saybolt universal viscosity at 210° F.

In general, a paraffin mineral oil having a viscosity-density constant of up to 0.819 usually contains at least about 70% by weight of paraffin saturated hydrocarbons.

Although it is unclear why impact strength is specifically increased by combining the polyethylene or ethylenic copolymer and the specific mineral oil, microscopic examination of a broken specimen shows that the polyethylene or ethylenic copolymer having a suitable particle diameter is dispersed in a continuous phase of the polyphenylene ether and the alkenylaromatic polymer, and craze formed at the time of break-down is present in the neighborhood of particle diameter. It is considered that since the craze is more increased when the specific mineral oil is compounded, the specific mineral oil compounded is present in the neighborhood of the polyethylene or ethylenic copolymer dispersed with a suitable particle diameter, participating in the affinity between the continuous phase and particles dispersed and thus contributing to an improvement in the impact strength. That is, such an improvement in impact strength is attained only when the polyethylene or ethylenic copolymer, and the specific mineral oil are compounded.

The compositions of the present invention comprise five components: (A) a polyphenylene ether, (B) an alkenylaromatic polymer, (C) a rubber substance, (D) a polyethylene or ethylenic copolymer, and (E) a mineral oil. The amount of the rubber substance (C) is preferably 1 to 15 parts by weight per 100 parts by weight of the mixture consisting of 20 to 80 parts by weight of the polyphenylene ether and 80 to 20 parts by weight of the alkenylaromatic polymer. More preferably the amount of the rubber substance (C) is 3 to 12 parts by weight. If the proportion of the polyphenylene ether compounded is less than 20 parts by weight, heat resistance is undesirably decreased. On the other hand, if it is in excess of 80 parts by weight, fluidity is decreased. If the amount of the rubber substance used is less than 1 part by weight, no sufficient impact resistance can be obtained. On the other hand, if it is in excess of 15 parts by weight, fluidity and gloss are undesirably decreased.

The compositions of the present invention comprise 0.5 to 10 parts by weight, preferably 0.8 to 7 parts by weight and more preferably 1 to 5 parts by weight of the polyethylene or ethylenic copolymer (D), and particularly preferably 1 to 3 parts by weight of the polyethylene or 2 to 5 parts by weight of the ethylenic copolymer, and 0.5 to 5 parts by weight, preferably 1 to 3 parts of the mineral oil, all per 100 parts by weight of the resin composition consisting of (A) the polyphenylene ether, (B) the alkenylaromatic polymer and (C) the rubber substance.

If the proportion of the polyethylene or ethylenic copolymer compounded is less than 0.5 part by weight, the effect of improving impact resistance is poor. On the other hand, if it is in excess of 10 parts by weight, layer separation occurs, resulting in the production of the layer separation phenomenon in the molded articles. If the proportion of the mineral oil compounded is less than 0.5 part by weight, the effect of improving impact resistance is poor. On the other hand, if it is in excess of 5 parts by weight, fluidity is increased, but heat resistance is decreased, and thus no composition having excellent balance can be obtained.

The method of preparation of the resin compositions of the present invention is not critical. The melt kneading method using a Banbury mixer, an extruder, a kneader and so forth is suitable.

To the compositions of the present invention, commonly used additives such as a heat stabilizer, a flame retardant, a pigment, a filler, a plasticizer, a lubricant and an ultraviolet ray absorbent can be added within the range that does not change greatly the physical properties of the compositions. In addition, fiber reinforcing agents such as glass fibers, asbestos fibers and carbon fibers can be added.

The present invention will now be illustrated in greater detail with reference to the following examples and comparative examples, but it should be understood that they are not intended to limit the present invention.

In these examples nd comparative examples, various physical properties were measured or evaluated according to the following methods:

(1) Melt Flow Rate:

Measured in accordance with ISO R1133 (JIS K7210) at a temperature of 250° C. under load of 10 kg.

2) Gloss:

Measured in accordance with ASTM D 523 (JIS Z8741).

(3) Izod Impact Strength (Notched):

Measured at 23° C. using an Izod impact tester manufactured by Toyo Seiki Seisakusho in accordance with ISO R180-1969 (JIS K7110).

(4) Dart Drop Impact Strength:

A dart (2 m x 7 kgf) as a load-sensing element is dropped on a specimen (120×80×2 mm) mounted on a clamping flame having a hole diameter of 40 mm, and the deformation and failure behaviors of the specimens under impact load are measured. The impact energy absorbed up to the crack initiation in the resulting impact pattern is calculated and taken as an impact strength value.

(5) Heat Distortion Temperature:

Measured in accordance with ISO R75-1958 Method A (JIS K7207-1974, A Method). In the measurement, injection-molded specimens were used without annealing.

EXAMPLES 1 to 3 and COMPARATIVE EXAMPLES 1 to 6

A poly(2,6-dimethyl-1,4-phenylene) ether which exhibited a reduced viscosity of 0.50 when dissolved in chloroform at a concentration of 0.5 g/dl at a temperature of 30° C., a rubber-modified polystyrene in which 8% by weight of polybutadiene had been compounded in the form of polystyrene-grafted elastomer gel layer in the matrix of polystyrene, and various polyethylenes, ethylenic copolymers and mineral oils were mixed in the proportions shown in Table 1, and kneaded and pelletized at 270° C. by the use of a biaxial knead extruder. Injection molding was performed by the use of N100 B-II type injection molding machine (manufactured by Nippon Seikojo Co., Ltd.) under the conditions of injection pressure of 1,000 kg/cm$^2$, cylinder temperature of 260° C. and mold temperature of 80° C. The results of evaluation of physical properties are shown in Table 1.

TABLE 1

| | Polyphenylene Ether (parts by weight) | Rubber-Modified Polystyrene (parts by weight) | Mineral Oil Parts by Weight | Mineral Oil Average Molecular Weight | Mineral Oil Paraffin Content (%) | Polyethylene[3] Parts by Weight | Polyethylene[3] Melt Flow Rate | Polyethylene[3] Density | Melt Flow Rate (g/10 min) | Gloss (%) | Izod Impact Strength (kg-cm/cm) | Dart Drop Impact Strength (kg-cm) | Heat Distortion Temperature (°C.) |
|---|---|---|---|---|---|---|---|---|---|---|---|---|---|
| Example 1 | 44 | 56 | 2 | 750 | 73[*1] | 2 | 1.2 | 0.92 | 4.8 | 40 | 17.6 | 92 | 124 |
| Example 2 | " | " | " | " | " | " | 15 | 0.92 | 4.9 | 41 | 18.5 | 165 | 124 |

TABLE 1-continued

| | Polyphenylene Ether (parts by weight) | Rubber-Modified Polystyrene (parts by weight) | Mineral Oil | | | Polyethylene[3] | | | Melt Flow Rate (g/10 min) | Gloss (%) | Izod Impact Strength (kg-cm/cm) | Dart Drop Impact Strength (kg-cm) | Heat Distortion Temperature (°C.) |
|---|---|---|---|---|---|---|---|---|---|---|---|---|---|
| | | | Parts by Weight | Average Molecular Weight | Paraffin Content (%) | Parts by Weight | Melt Flow Rate | Density | | | | | |
| Example 3 | " | " | " | " | " | " | 45 | 0.92 | 4.9 | 41 | 18.6 | 168 | 124 |
| Comparative Example 1 | " | " | — | — | — | — | — | — | 4.8 | 38 | 10.5 | 68 | 125 |
| Comparative Example 2 | " | " | 2 | 750 | 73*[1] | — | — | — | 4.1 | 40 | 12.1 | 78 | 124 |
| Comparative Example 3 | " | " | 6 | " | " | — | — | — | 9.8 | 49 | 12.8 | 79 | 98 |
| Comparative Example 4 | " | " | — | — | — | 2 | 15 | 0.92 | 4.5 | 40 | 14.3 | 105 | 125 |
| Comparative Example 5 | " | " | 2 | 500 | 26*[2] | " | 15 | 0.92 | 5.0 | 42 | 14.9 | 110 | 123 |
| Comparative Example 6 | " | " | " | 750 | 73*[1] | " | 0.7 | 0.92 | 4.6 | 40 | 15.0 | 90 | 124 |

*[1]PW-380 produced by Idemitsu Kosan Co., Ltd.
*[2]AC-40 produced by Idemitsu Kosan Co., Ltd.
*[3]Long chain branched polyethylene produced by Mitsubishi Petrochemical Co., Ltd.

EXAMPLES 4 to 14

The procedure of Example 1 was repeated with the exception that the polyethylene was replaced with an ethylenic copolymer and the amount of the copolymer compounded was changed. The results of evaluation of physical properties are shown in Table 2.

It can be seen from the results of Tables 1 and 2 that compositions excellent in the balance among physical properties can be obtained only when the specific polyethylene, ethylenic copolymer and mineral oil are compounded in the composition of the polyphenylene ether and the rubber-modified polystyrene.

EXAMPLES 15 and 16 and COMPARATIVE EXAMPLES 7 and 8

A poly-2,6-dimethylphenol which exhibited a reduced viscosity of 0.50 when dissolved in chloroform at a concentration of 0.5 g/dl at a temperature of 30° C., a rubber-modified polystyrene in which 7% by weight of polybutadiene had been compounded in the form of polystyrene grafted elastomer gel layer in the matrix of polystyrene, triphenyl phosphate, a mineral oil and a polyethylene were mixed in the proportions shown in Table 3 and pelletized at 70° C. by the use of a biaxial extruder. Injection molding was performed by the use of Model N100B-II injection molding machine (manufactured by Nippon Seikojo Co., Ltd.) at an injection pressure of 1,000 kg/cm² and a cylinder temperature of 260° C. The results of evaluation of physical properties are shown in Table 3.

EXAMPLES 17 to 20 and COMPARATIVE EXAMPLES 9 to 11

The same polyphenylene ether and rubber-modified polystyrene as used in Example 15, a rubber-modified polystyrene having a rubber content exceeding the specific range of the present invention, a polyethylene and a mineral oil were mixed in the proportions shown in Table 4 and pelletized at 270° C. by the use of a biaxial extruder. Injection molding was performed by the use of the same apparatus as used in Example 15 at an injection pressure of 1,000 kg/cm² and a cylinder temperature of 290° C. The results of evaluation of physical properties are shown in Table 4.

EXAMPLES 21 to 24 and COMPARATIVE EXAMPLE 12

The same polyphenylene ether, rubber-modified polystyrene, triphenyl phosphate, mineral oil and polyethylene as used in Example 15 were mixed in the propor-

TABLE 2

| | Polyphenylene Ether (parts by weight) | Rubber-Modified Polystyrene (parts by weight) | Mineral Oil | | | Ethylenic Copolymer | | | Melt Flow Rate (g/10 min) | Gloss (%) | Izod Impact Strength (kg-cm/cm) | Dart Drop Impact Strength (kg-cm) | Heat Distortion Temperature (°C.) |
|---|---|---|---|---|---|---|---|---|---|---|---|---|---|
| | | | Parts by Weight | Average Molecular Weight | Paraffin Content (%) | Parts by Weight | Melt Flow Rate | Density | | | | | |
| Example 4 | 44 | 56 | 2 | 750 | 73 | 2*[1] | 2 | 0.95 | 4.7 | 40 | 16.0 | 138 | 124 |
| Example 5 | " | " | " | " | " | 2*[2] | 10 | 0.96 | 4.8 | 41 | 18.5 | 153 | 124 |
| Example 6 | " | " | " | " | " | 2*[3] | 5 | 0.94 | 4.6 | 40 | 15.2 | 149 | 124 |
| Example 7 | " | " | " | " | " | 2*[4] | 12 | 0.94 | 4.7 | 41 | 15.5 | 163 | 124 |
| Example 8 | " | " | " | " | " | 2*[5] | 6 | 0.93 | 4.7 | 40 | 16.9 | 140 | 124 |
| Example 9 | " | " | " | " | " | 2*[6] | 15 | 0.93 | 4.7 | 41 | 17.0 | 138 | 124 |
| Example 10 | " | " | " | " | " | 2*[7] | 1.5 | 0.94 | 4.8 | 41 | 17.2 | 155 | 124 |
| Example 11 | " | " | " | " | " | 2*[8] | 5 | 0.95 | 4.7 | 41 | 16.2 | 151 | 124 |
| Example 12 | " | " | " | " | " | 2*[9] | 20 | 0.95 | 4.8 | 42 | 17.2 | 158 | 124 |
| Example 13 | " | " | " | " | " | 5*[10] | 12 | 0.94 | 5.1 | 42 | 15.1 | 157 | 122 |
| Example 14 | " | " | " | " | " | 7*[11] | 12 | 0.94 | 5.6 | 43 | 14.9 | 147 | 120 |

*[1] and [2]Ethylene/propylene copolymer
*[3] and [4]Ethylene/acrylate copolymer
*[5] and [6]Ethylene/methyl acrylate copolymer
*[7] to [9]Ethylene/butene-1 copolymer
*[10] and [11]Ethylene/acrylate copolymer tions shown in Table 5 and pelletized at a temperature of 270° C. by the use of a biaxial extruder. Injection molding was performed by the use of Model N100B-II injection molding machine (manufactured by Nippon Seikojo Co., Ltd.) at an injection pressure of 1,000 kg/cm² and a cylinder temperature of 260° C. The results of evaluation of physical properties are shown in Table 5.

kenylaromatic polymer, wherein the weight ratio of (A) to (B) is (A)/(A)+(B)≧0.2, and 1 to 15 parts by weight, per 100 parts by weight of the total weight of (A) and (B), of (C) a rubber substance;
(ii) 0.5 to 10 parts by weight of (D) a copolymer obtained by copolymerizing ethylene with an α-olefin having 3 to 8 carbon atoms; and
(iii) 0.5 to 5 parts by weight of (E) a mineral oil.

TABLE 3

| | Polyphenylene Ether (parts by weight) | Rubber-Modified Polystyrene (parts by weight) | Triphenyl Phosphate (parts by weight) | Mineral Oil | | Polyethylene | | Melt Flow Rate (g/10 min) | Gloss (%) | Izod Impact Strength (kg-cm/cm) | Dart Drop Impact Strength (kg-cm) | Heat Distortion Temperature (°C.) |
| | | | | Amount (parts by weight) | Viscosity-Density Constant | Amount (parts by weight) | Grade | | | | | |
| --- | --- | --- | --- | --- | --- | --- | --- | --- | --- | --- | --- | --- |
| Comparative Example 7 | 45 | 42 | 13 | — | — | — | — | 18 | 68 | 12 | 62 | 80 |
| Comparative Example 8 | " | " | " | 2*1 | 0.794 | — | — | 22 | 74 | 17 | 62 | 78 |
| Example 15 | " | " | " | " | " | 2 | F30F*2 | 22 | 75 | 24 | 190 | 78 |
| Example 16 | " | " | " | " | " | " | M60T*3 | 23 | 78 | 23 | 180 | 78 |

*1PW-380 manufactured by Idemitsu Kosan Co., Ltd.
*2Short chain branched polyethylene (manufactured by Mitsubishi Petrochemical Co., Ltd.) having a melt flow rate of 1, a density of 0.920 and a melt flow ratio of 8.0.
*3Short chain branched polyethylene (manufactured by Mitsubishi Petrochemical Co., Ltd.) having a melt flow rate of 20, a density of 0.926 and a melt flow ratio of 7.8.

TABLE 4

| | Polyphenylene Ether (parts by weight) | Rubber-Modified Polystyrene (parts by weight) | Mineral*2 Oil (parts by weight) | Polyethylene*3 (parts by weight) | Melt Flow Rate (g/10 min) | Gloss (%) | Izod Impact Strength (kg-cm/cm) | Dart Drop Impact Strength (kg-cm) | Heat Distortion Temperature (°C.) |
| --- | --- | --- | --- | --- | --- | --- | --- | --- | --- |
| Comparative Example 9 | 45 | 55*4 | 3 | — | 5.0 | 50 | 17 | 69 | 108 |
| Example 17 | " | " | " | 0.5 | 5.0 | 50 | 19 | 101 | 108 |
| Example 18 | " | " | " | 1 | 5.2 | 51 | 22 | 147 | 108 |
| Example 19 | " | " | " | 2 | 5.5 | 56 | 26 | 158 | 108 |
| Example 20 | " | " | " | 5 | 6.0 | 62 | 28 | 176 | 108 |
| Comparative Example 10 | " | " | " | 15 | 7.8 | 78 | 15 | 44 | 107 |
| Comparative Example 11 | " | 55*1 | — | — | 2.7 | 37 | 27 | 150 | 106 |

*124 parts by weight of SBR1502 (manufactured by Nippon Gosei Gomu Co., Ltd.) was added to the rubber-modified polystyrene used in Example 15 to adjust the rubber content of the rubber-modified polystyrene to 25% by weight.
*2PW-380 produced by Idemitsu Kosan Co., Ltd.
*3F30F produced by Mitsubishi Petrochemical Co., Ltd., short chain branched polyethylene
*4Same rubber-modified polystyrene as used in Example 15.

TABLE 5

| | Polyphenylene Ether (parts by weight) | Rubber-Modified Polystyrene (parts by weight) | Triphenyl Phosphate (parts by weight) | Mineral*1 Oil (parts by weight) | Polyethylene*2 (parts by weight) | Melt Flow Rate (g/10 min) | Gloss (%) | Izod Impact Strength (kg-cm/cm) | Dart Drop Impact Strength (kg-cm) | Heat Distortion Temperature (°C.) |
| --- | --- | --- | --- | --- | --- | --- | --- | --- | --- | --- |
| Example 21 | 45 | 42 | 13 | 0.5 | 2 | 20 | 71 | 20 | 150 | 80 |
| Example 22 | " | " | " | 1 | " | 21 | 73 | 22 | 174 | 79 |
| Example 23 | " | " | " | 2 | " | 22 | 75 | 24 | 190 | 78 |
| Example 24 | " | " | " | 4 | " | 25 | 80 | 28 | 195 | 74 |
| Comparative Example 12 | " | " | " | 10 | " | 42 | 86 | 29 | 209 | 63 |

*1PW-380 produced by Idemitsu Kosan Co., Ltd.
*2F30F produced by Mitsubishi Petrochemical Co., Ltd., short chain branched polyethylene While the invention has been described in detail and with reference to specific embodiments thereof, it will be apparent to one skilled in the art that various changes and modifications can be made therein without departing from the spirit and scope thereof.

What is claimed is:
1. A polyphenylene ether composition, comprising:
(i) 100 parts by weight of a resin composition comprising (A) a polyphenylene ether, (B) an al-

2. The composition of claim 1, wherein the copolymer obtained by copolymerizing ethylene with and α-olefin having 3 to 8 carbon atoms (D) has a density of 0.88 to 0.96 g cm$^{-3}$ and a melt flow rate of 1 to 80 g/10 min.

3. The composition of claim 1, wherein the copolymer obtained by copolymerzing ethylene with and α-olefin having 3 to 8 carbon atoms (D) contains 0.5 to 10 wt.% of said α-olefin.

4. The composition of claim 3, wherein the copolymer obetained by copolymerizing ethylene with an α-olefin having 3 to 8 carbon atoms (D) is an ethylene-propylene copolymer.

5. The composition of claim 1, wherein the copolymer obtained by copolymerizing ethylene with an α-olefin having 3 to 8 carbon atoms (D) has a melt flow ratio of up to 10, a density of 0.90 to 0.940 g cm$^{-3}$ and a melt flow rate of 1 to 80 g/10 min.

6. The composition of claim 1, wherein the amount of the copolymer obtained by copolymerizing ethylene with an α-olefin having 3 to 8 carbon atoms (D) compounded to 0.8 to 7 parts by weight per 100 parts by weight of the resin composition.

7. The composition of claim 1, wherein the mineral oil (E) is a paraffinic mineral oil having an average molecular weight of 500 to 1000.

8. The composition of claim 1, wherein the mineral oil (E) has a viscosity-density constant of up to 0.819.

9. The composition of claim 1, wherein the amount of the mineral oil (E) compounded is 1 to 3 parts by weight per 100 parts by weight of the resin composition.

10. The composition of claim 1, wherein the amount of the copolymer obtained by copolymerizing ethylene with an α-olefin havine 3 to 8 carbon atoms (D) is 0.8 to 7 parts by weight and the amount of the mineral oil (E) is 1 to 3 parts by weight, each per 100 parts by weight of the resin composition, and the amount of the rubber substance is 3 to 12 parts by weight per 100 parts by weight of the total weight of (A) and (B).

11. The composition of claim 1, wherein said polyphenylene ether (A) is a homopolymer having a recurring unit represented by the formula:

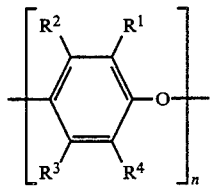

or a copolymer having two or more of said recurring unit of said formula wherein:

$R^1$, $R^2$, $R^3$ and $R^4$, which are the same of different, each represents a hydrogen atom, a halogen atom, a hydrocarbon group, a substituted hydrocarbon group, a hydrocarbon oxy group, or a substituted hydrocarbon oxy group.

12. The composition of claim 1, wherein said polyphenylene ether(A) is at least one member selected from the group consisting of poly-2, 6-dimethyl-1, 4-phenylene ether, poly-2, 6-diethyl-1, 4-phenylene ether; poly-2, 6-dipropyl-1,4-phenylene ether; poly-2-methyl-6-isopropyl-1,4-phenylene ether; poly-2-ethyl-6-phenylene ether; poly-2, 6-dimethoxy-1,4-phenylene ether; poly-2, 6-diphenyl-1, 4-phenylene ether; poly-2, 6-dichloro-1,4-phenylene ether; poly-2, 5-dimethyl-1,4-phenylene ether, a copolymer of 2, 6-dimethylphenol and 2, 3, 6-trimethylphenol; and a copolymer of 2, 6-dimethylphenol and 3-methyl-6-tetr-butylphenol.

13. The composition of claim 1, wherein said alkenylaromatic polymer (B) is a homopolymer or a copolymer containing at least 50% by weight of an alkenylaromatic compound represented by the formula:

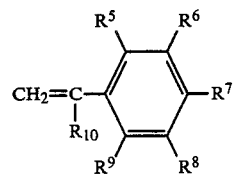

wherein:

$R^5$, $R^6$, $R^7$, $R^8$ and $R^9$, which are the same or different, each represents a hydrogen atom, a halogen atom, a hydrocarbon group, a substituted hydrocarbon group, a hydrocarbon oxy group, or a substituted hydrocarbon oxy group; and $R^{10}$ is a hydrogen atom or a lower alkyl group having 1 to 4 carbon atoms.

14. The composition of claim 1, wherein said alkenyl aromatic polymer (B) is at least one member selected from the group consisting of polystyrene, polychlorostyrene, poly-α-methylstyrene, a styrene-acrylonitrile copolymer, a styrene-α-methylstyrene copolymer, a styrene-4-methylstyrene copolymer, a styrene-maleic anhydride copolymer, a styrene-methyl methacrylate copolymer, polybutadiene-modified high impact polystyrene and a styrene-acrylonitrile-butadiene terpolymer.

15. The composition of claim 14, wherein said alkenyl aromatic polymer is polystyrene.

16. The composition of claim 1, wherein said rubber substance (C) is polybutadiene, a butadiene-styrene copolymer, or an ethylene-propylene-diene rubber.

* * * * *